US007187802B2

(12) United States Patent
Ju

(10) Patent No.: US 7,187,802 B2
(45) Date of Patent: Mar. 6, 2007

(54) METHOD AND APPARATUS FOR PROGRESSIVE JPEG IMAGE DECODING

(75) Inventor: Chi-Cheng Ju, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 702 days.

(21) Appl. No.: 10/290,302

(22) Filed: Nov. 8, 2002

(65) Prior Publication Data

US 2003/0091240 A1    May 15, 2003

(30) Foreign Application Priority Data

Nov. 9, 2001    (TW) .............................. 90127965 A

(51) Int. Cl.
*G06K 9/36* (2006.01)
*G06K 9/46* (2006.01)
(52) U.S. Cl. ..................................... 382/233
(58) Field of Classification Search ................. 382/233
See application file for complete search history.

(56) References Cited

U.S. PATENT DOCUMENTS

| | | | | |
|---|---|---|---|---|
| 5,724,070 A | * | 3/1998 | Denninghoff et al. | 345/547 |
| 5,815,097 A | * | 9/1998 | Schwartz et al. | 341/51 |
| 6,111,566 A | * | 8/2000 | Chiba et al. | 345/555 |
| 6,141,453 A | * | 10/2000 | Banham et al. | 382/240 |
| 6,345,126 B1 | * | 2/2002 | Vishwanath et al. | 382/253 |
| 6,356,665 B1 | * | 3/2002 | Lei et al. | 382/240 |
| 6,608,933 B1 | * | 8/2003 | Dowell et al. | 382/232 |
| 6,664,902 B2 | * | 12/2003 | Andrew et al. | 341/50 |
| 2001/0002937 A1 | * | 6/2001 | Warner et al. | 382/232 |

OTHER PUBLICATIONS

Jaehan In, Shahram Shirani, and Faouzi Kossentini, "On RD Optimized Progressive Image Coding Using JPEG", IEEE Transactions on Image processing, vol. 8, No. 11, Nov. 1999.*
JPEG specification (ITU T.81 ISO/IEC 10918-1 : 1993(E).*

* cited by examiner

*Primary Examiner*—Joseph Mancuso
*Assistant Examiner*—Yuzhen Ge
(74) *Attorney, Agent, or Firm*—Birch, Stewart, Kolasch & Birch, LLP

(57) ABSTRACT

A method and an apparatus for decoding a progressive joint photographic experts group (JPEG) bit stream as image data indicative of an image are disclosed. The method includes the following steps. First, the data indicative of a scan of the JPEG bit stream are received. Second, the data indicative of the scan are divided into a plurality of regions. One of the regions is then selected as a decoding region. Next, after the data indicative of the scan are decoded, the decoded coefficients produced according to the data indicative of the decoding region of the scan, and the nonzero history of decoded coefficients of the other regions produced according to data indicative of the other regions of the scan are stored in the memory. Finally, the decoded coefficients of the decoding region are outputted so as to construct a portion of the image data.

20 Claims, 4 Drawing Sheets

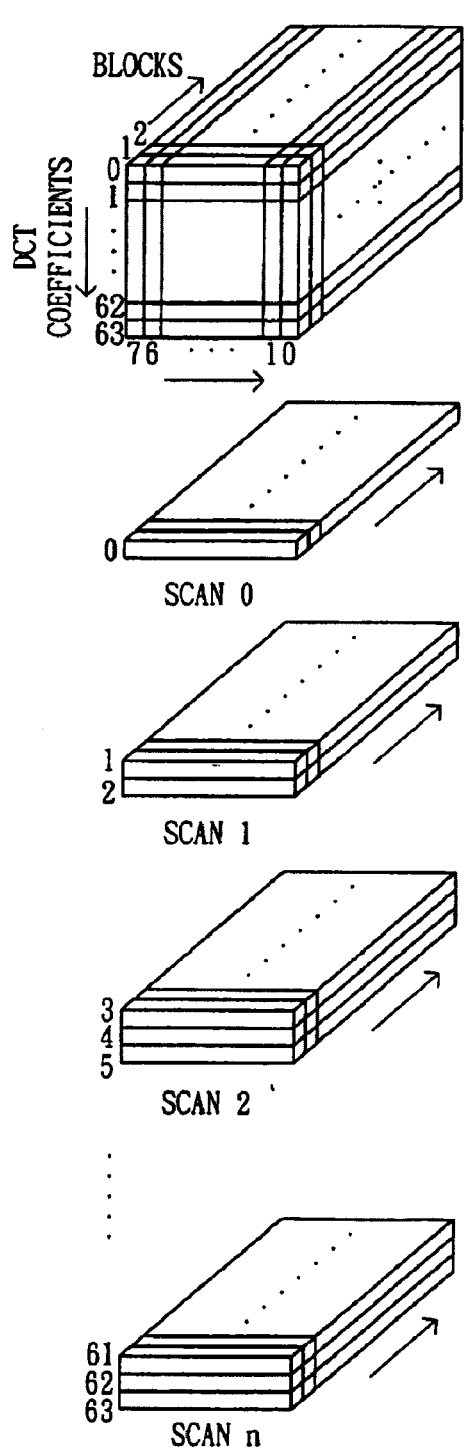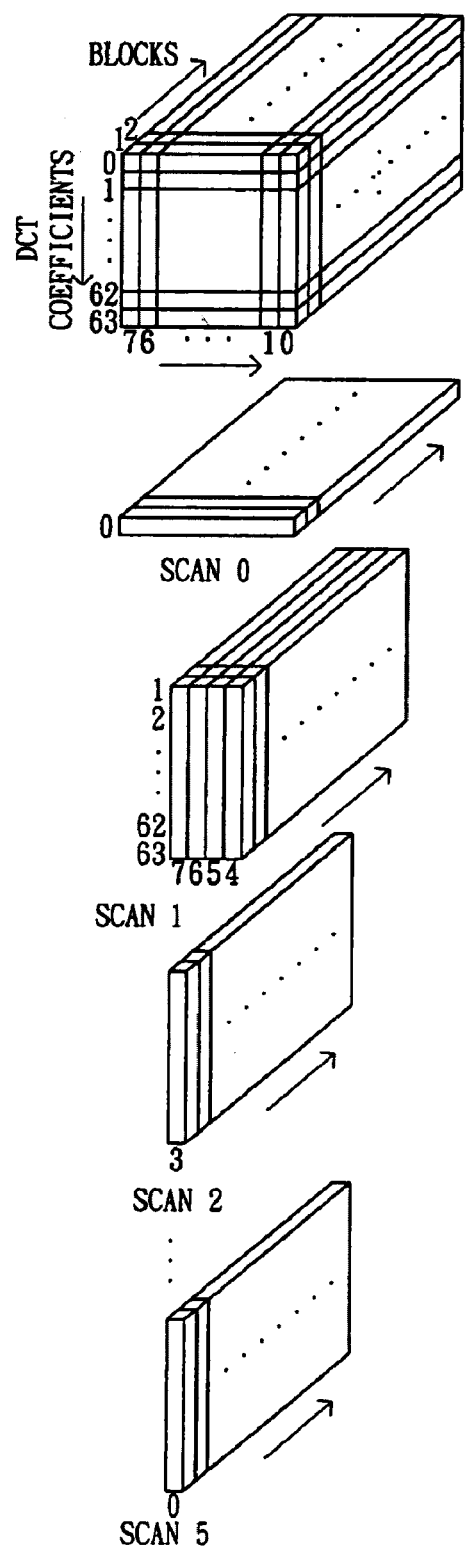
FIG. 1 (PRIOR ART)
FIG. 2 (PRIOR ART)

METHOD AND APPARATUS FOR PROGRESSIVE JPEG IMAGE DECODING

This nonprovisional application claims priority under 35 U.S.C. § 119(a) on Patent Application No. 090127965 filed in TAIWAN on Nov. 9, 2001, which is herein incorporated by reference.

BACKGROUND OF THE INVENTION

1. Field of the Invention

The invention relates in general to a method and an apparatus for joint photographic experts group (JPEG) image decoding, and in particular to an apparatus for progressive JPEG image decoding and a method thereof.

2. Description of the Related Art

JPEG is a standard for gray or color still image compression, and is widely used due to its effectiveness. JPEG provides four different modes with respective encoding and decoding methods. The four modes are sequential discrete cosine transform (DCT) based mode, progressive DCT-based mode, lossless mode, and hierarchical mode, where DCT is used for transforming signals in the time domain into signals in the frequency domain.

For the sequential DCT-based mode, uncompressed samples of an image are grouped into sample blocks of 8 by 8 pixels, and the sample blocks are processed block by block from left to right and block-row by block-row from top to bottom. When one of the sample blocks is transformed into 64 DCT coefficients by forward DCT, the 64 DCT coefficients are quantized by a quantizer and then the JPEG bit stream is produced by performing variable length encoding, for example, Huffman encoding, of the quantized DCT coefficients by a variable length encoder.

For the progressive DCT-based mode, the sample blocks of an image are also typically encoded in the same order as the sequential DCT-based mode, but in multiple scans through the image. After compression, the JPEG bit stream then includes multiple progressively encoded scan data. The encoding process is accomplished by adding an image-sized coefficient memory buffer between the quantizer and the variable length encoder. This buffer stores the coefficients of the whole image. As each sample block is transformed by performing forward DCT and then quantized, its quantized DCT coefficients are obtained and temporarily stored in this buffer. After all the sample blocks are transformed and quantized, the quantized DCT coefficients are stored in the buffer and then partially encoded in multiple scans. For each scan, the variable length encoder partially encodes the quantized DCT coefficients. The progressive DCT-based mode advantages the progressive decoding of the image when the image data is being transmitted in a limited network bandwidth environment. In such case, the decoder at the receiving end can decode the arrived scan data from the JPEG bit stream, so a rough image can be displayed at the receiving end. The image is further refined progressively when more subsequent scans are received at the receiving end. In this way, the decoding of the bit stream at the receiving end can begin without waiting for the entire bit stream to arrive, and the received image data is updated progressively.

There are two methods by which the quantized DCT coefficients in the buffer may be partially encoded within a scan. They are spectral selection and successive approximation methods. In the spectral selection method, only a specified frequency band of the coefficients of each sample block needs to be encoded in each scan. For example, the lower-frequency image data of the sample block is encoded first, and then the higher-frequency image data of the sample block is encoded. In the successive approximation method, a portion of bits of each quantized DCT coefficient is encoded each time. A specified number of most significant bits (MSB) are first encoded. In subsequent scans, a specified number of least significant bits (LSB) are encoded.

FIG. 1 illustrates the spectral selection method. In FIG. 1, each small cube represents one bit and each row of cubes represents a quantized DCT coefficient of a sample block, where the bit on the leftmost side and the bit on the rightmost side of each row are the MSB and the LSB of the corresponding quantized DCT coefficient, respectively. The 64 successive rows of cubes from top to bottom represent all 64 DCT coefficients of a sample block. In the first scan, the zeroth quantized DCT coefficients of all sample blocks, referred to as scan 0, are encoded. In the second scan, the first and second quantized DCT coefficients of all sample blocks, referred to as scan 1, are encoded. In the third scan, the third, fourth, and fifth quantized DCT coefficients of all sample blocks, referred to as scan 2, are encoded. In the subsequent scans, the remaining scans are encoded in this way. Since each quantized DCT coefficient of a sample block corresponds to a different frequency band, spectral selection method is achieved by encoding different quantized DCT coefficients of the sample blocks according to their frequency band.

FIG. 2 illustrates the successive approximation method. In the first scan, the zeroth quantized DCT coefficients of all sample blocks are encoded and referred to as scan 0. In the second scan, the fourth, fifth, sixth, and seventh bits of the quantized DCT coefficients of all sample blocks are encoded and referred to as scan 1. In the third scan, the third bits of the quantized DCT coefficients of all sample blocks are encoded and referred to as scan 2. In this way, successive approximation is achieved by encoding the corresponding bits for all sample blocks according to their significance. In addition, a different progressive sequence can be achieved by combining the spectral selection method with the successive approximation method.

After illustrating progressive JPEG encoding methods, the progressive JPEG decoding method is now discussed. In a typical progressive JPEG decoding system, an image-sized coefficient memory buffer is required to store the variable-length-decoded coefficients after variable length decoding. When collecting all the variable-length-decoded coefficients of a scan, the decoder may further perform inverse quantization and inverse DCT (IDCT) operations upon these variable-length-decoded coefficients to produce a partially reconstructed image, whereby the partially reconstructed image can first be displayed. The partially reconstructed image can later be refined progressively when the variable-length-decoded coefficients of other scans are also ready and processed by the IDCT operations. However, the main drawback of the typical progressive JPEG decoding system is the requirement of an image-sized coefficient memory buffer. Since the image to be reconstructed may have a huge size, the buffer size will become very large. For example, an image may have a maximum size of 65,535 by 65,535 pixels as specified in JPEG T.81 specification. Since an ordinary JPEG decoding system does not have such a large buffer, the decoding of the image would fail. Furthermore, information appliance (IA) products are widely used nowadays, and are generally equipped with a much smaller memory. For these IA products, decoding of a large-sized progressive JPEG compressed image becomes impossible. Hence, in view of the above-mentioned problems, it is desirable to develop a progressive JPEG decoding apparatus and method, which can decode progressive JPEG compressed images even under an environment with limited memory resources.

SUMMARY OF THE INVENTION

It is therefore an object of the invention to provide an apparatus for progressive JPEG decoding and a method thereof so that progressive JPEG decoding can be performed with a limited memory resource.

The invention achieves the above-identified object by providing an apparatus for JPEG decoding upon receiving a JPEG bit stream so as to output image data indicative of the image. The apparatus includes a memory, a memory management unit, and a processing unit. The memory management unit is coupled to the memory, and is used for controlling the memory access. The processing unit is coupled to the memory and the memory management unit, and is used for receiving the JPEG bit stream and outputting the image data by executing a method for JPEG decoding. The method includes the following steps. First, data indicative of a scan of the JPEG bit stream are received. Second, the data indicative of the scan are divided into a plurality of regions. One of the regions is then selected as a current decoding region. Next, after the data indicative of the scan are decoded, decoded coefficients of the current decoding region are produced according to the data indicative of the decoding region; a nonzero history of the decoded coefficients of the current remaining regions and the beginning addresses of the current remaining regions are produced according to the data indicative of the remaining regions of the scan. The current remaining regions are the regions of the scan except the current decoding region of the current scan. The decoded coefficients of the current decoding region, the nonzero history of the decoded coefficients of the current remaining regions, and the beginning addresses of the current remaining regions are stored in the memory. The above steps repeat until all scans are decoded. Finally, the decoded coefficients of the current decoding region of all scans are outputted in order to construct a portion of the image data.

The principle of the invention is to divide a progressive JPEG image into different regions and then decode the regions individually, wherein the buffer size required for decoding each region is reduced. In this way, even with a limited memory resource, the progressive JPEG decoding of the regions can be performed. Certainly, the invention is capable of decoding the whole image at one time when the system memory is large enough for decoding the whole image.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 1 illustrates a spectral selection method.

FIG. 2 illustrates a successive approximation method.

DETAILED DESCRIPTION OF THE INVENTION

Figure 3:
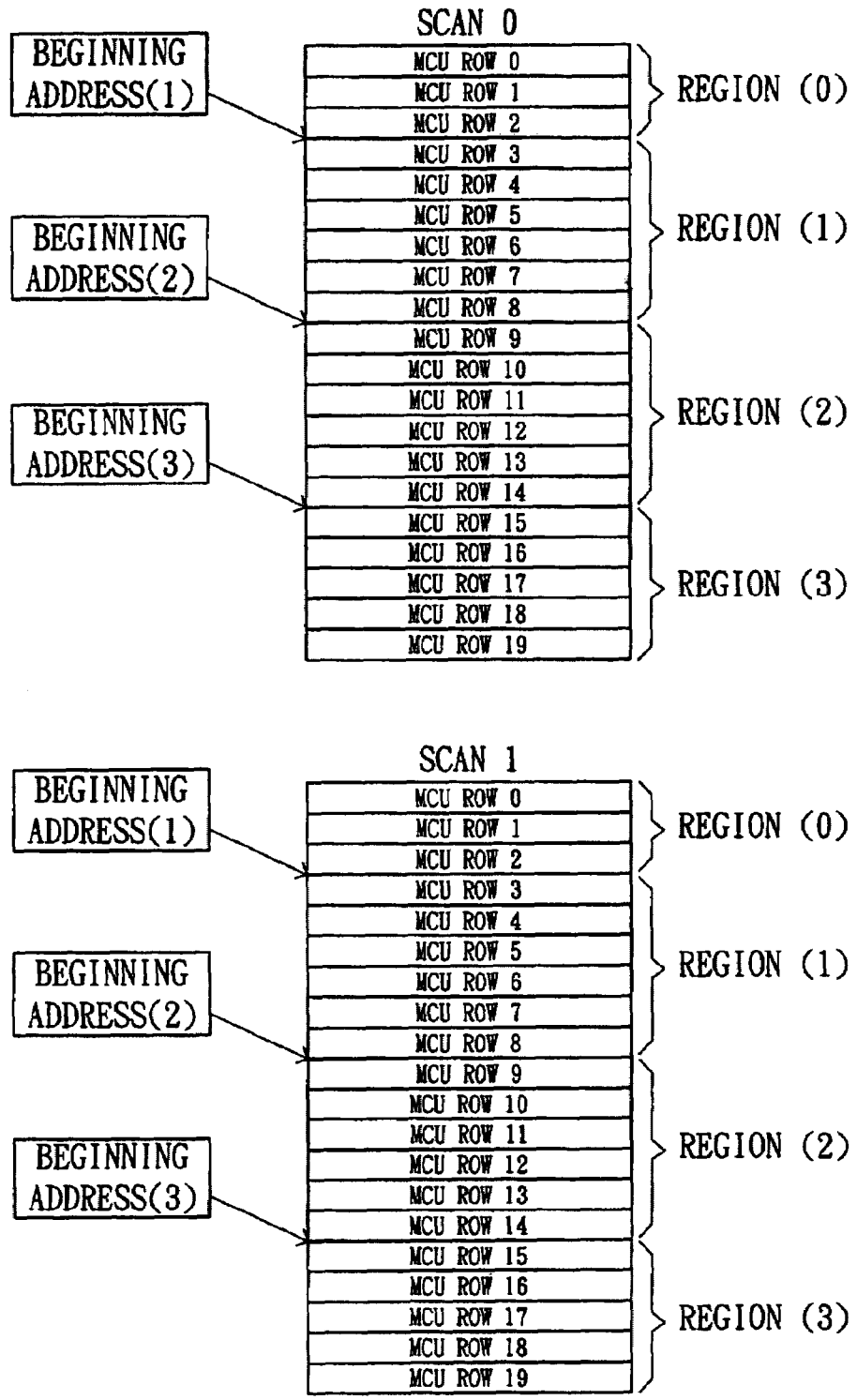
FIG. 3 illustrates region configuration for scans according a preferred embodiment of the invention.

According to one preferred embodiment of the invention, each scan of the progressive JPEG image is divided into a number of regions. Each region may comprise one or more minimum coded unit (MCU) rows. The number of the regions for each scan is determined according to the size of the memory. For each decoding, one of all the regions in a scan is selected as a current decoding region while the other regions in the same scan are defined as the current remaining regions. After the current decoding region of the current scan and the current decoding regions corresponding to all other scans have been decoded, another region is selected as a subsequent decoding region. Then the subsequent decoding region of the current scan, and the subsequent decoding regions corresponding to all other scans are decoded. The decoding of the scans is performed region by region in this way until all regions of all scans are decoded. When decoding a current decoding region of a current scan, the decoder also decodes the same decoding region corresponding to the next scans. The decoder needs to read data of the beginning address of the current decoding region corresponding to the next scan in the JPEG bit stream. Since the JPEG bit stream is produced by variable length encoding, variable length decoding of the regions between the decoding regions in the current and subsequent scans must be performed to determine the beginning address of the decoding region of the next scan in the JPEG bit stream. Furthermore, the decoding process of scans in a progressive JPEG bit stream is dependent. That is, in order to decode the current decoding regions of the current scan, the decoder has to refer to the decoded data of the current decoding regions corresponding to previous scans. Therefore, the decoded coefficients obtained when decoding previous scans need to be stored in the memory so as to be used when decoding the next scan. Because of the limited memory resource, an image-sized buffer may be unavailable for storing all the decoded coefficients in the previous scans. After carefully investigating the G. 1.2.3 section of international telecommunication union (ITU) T.81 JPEG specification, the inventor of the present invention finds that during Huffman variable length decoding of a coefficient in a current scan, only the nonzero history of the decoded coefficients of the same decoding region corresponding to the previous decoded scans is needed. The nonzero history is the information of whether or not the decoded coefficient of the same decoding region corresponding to each of the previous scans is a non-zero value. Thus, the preferred embodiment according to the present invention stores only the nonzero history of every decoded coefficient of the current remaining regions, rather than storing all decoded coefficients, for Huffman variable length decoding process. In addition, the nonzero history of each coefficient needs to be stored using only one bit, indicating whether or not the co-sited decoded coefficient of the same decoding region corresponding to each of the previous scans is a non-zero value. Therefore, the memory space for storing the nonzero history of the coefficients is very small so the memory resource required for use in decoding can be reduced significantly and dramatically.

FIG. 3 illustrates region configuration for a scan according a preferred embodiment of the invention. In this example, assume the image contains two scans: scan (0) and scan (1). Scan (0) and scan (1) have their respective regions (0), regions (1), regions (2), and regions (3). Each region (0) has three MCU rows. Each region (1) has six MCU rows.

Each region (2) has six MCU rows. Each region (3) has only five MCU rows because there are totally 20 MCU rows and no more MCU rows left.

Figure 4:
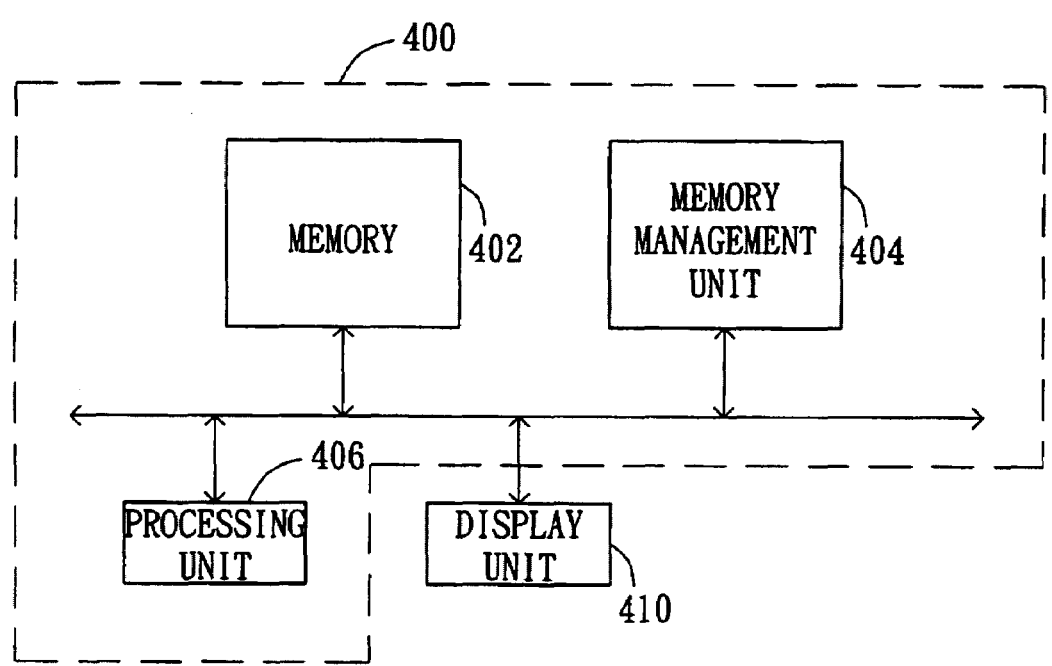
FIG. 4 is a block diagram illustrating a progressive JPEG decoding system according to the preferred embodiment of the invention.

FIG. 4 shows a block diagram illustrating a progressive JPEG decoder according to a preferred embodiment of the invention. A decoding device 400 includes a memory 402, a memory management unit 404, and a processing unit 406. The processing unit 406 is used for fetching a JPEG bit stream stored in the memory 402 with the aid of the memory management unit 404, producing the decoded coefficients by decoding the JPEG bit stream, and outputting the decoded coefficients, which are stored back into the memory 402. The display unit 410 fetches the decoded coefficients from the memory 402 with the aid of the memory management unit 404 for displaying the image corresponding to the JPEG bit stream on the display unit, such as a monitor. The processing unit 406 can be, for example, a digital signal processor (DSP) and is used for executing a progressive JPEG decoding method according to the invention. The memory management unit 404 is used to control access to the memory 402.

Figure 5:
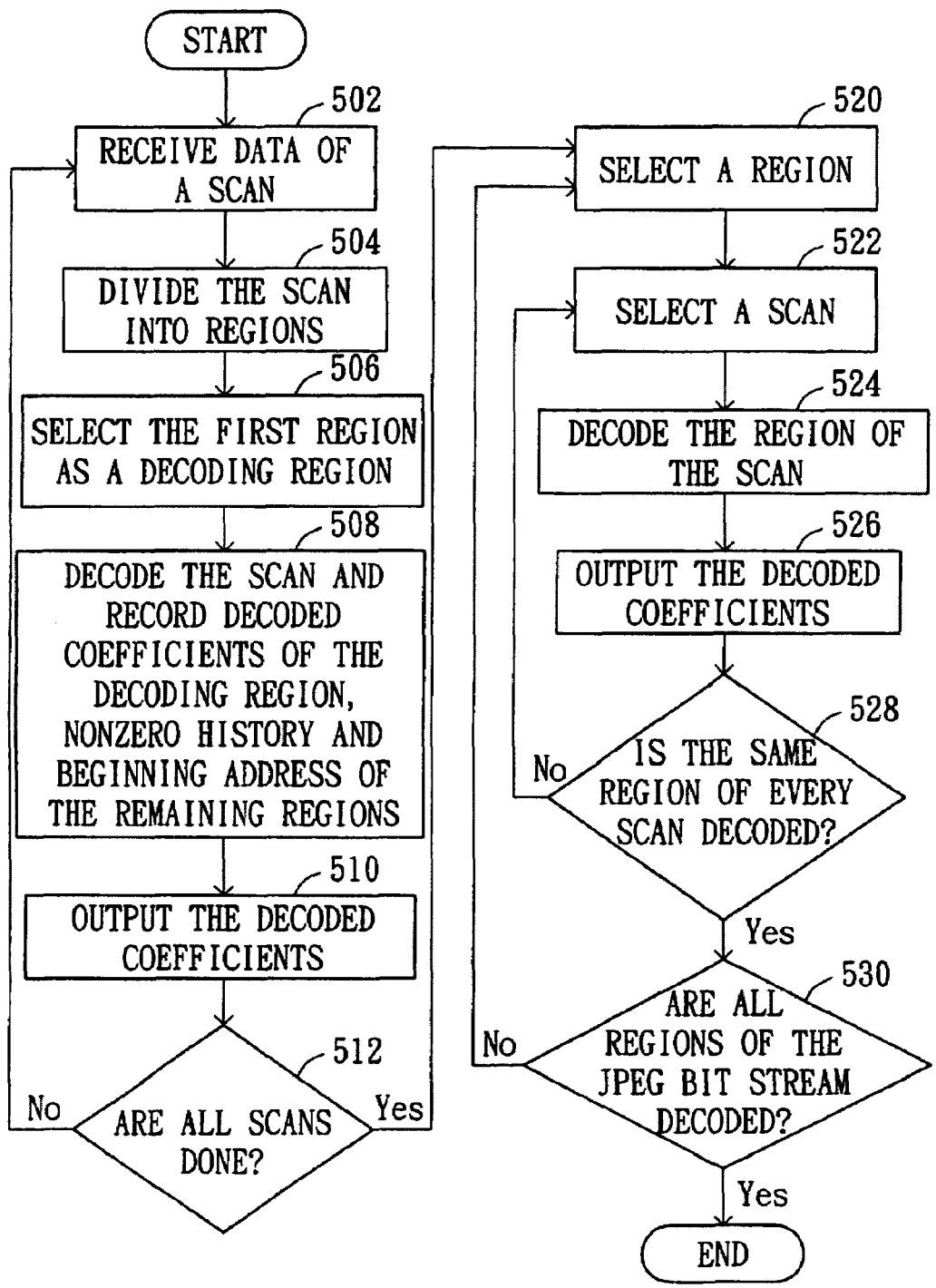
FIG. 5 is a flowchart illustrating a progressive JPEG decoding method according to the preferred embodiment of the invention.

FIG. 5 illustrates a progressive JPEG decoding method according to the preferred embodiment of the invention. The progressive JPEG decoding method includes a first decoding procedure and a second decoding procedure. The memory includes a coefficient buffer, a nonzero history buffer, and a beginning address buffer. The coefficient buffer is used for storing the decoded coefficients produced by performing variable length decoding of the current decoding region. The nonzero history buffer is used for storing the nonzero history of the decoded coefficients of the current remaining regions, wherein the current remaining regions are the regions of the current scan except the current decoding region. The beginning address buffer is used for storing the beginning address of the received JPEG bit stream for the current remaining regions of each scan. The first decoding procedure includes the following steps. First, the data of a scan of a JPEG bit stream are received, as shown in step 502. In step 504, the scan is divided into a plurality of regions, such as a first region, a second region, a third region, . . . etc, and each region contains one or more MCU rows. The sizes of the first regions of all corresponding scans are identical; the sizes of the second regions of all corresponding scans are identical, and so on. Next, the first region is selected, and defined as a current decoding region, as shown in step 506. In step 508, the current scan is decoded, and all the decoded coefficients of the current decoding region (the first region in this example), the nonzero history of the decoded coefficients of the current remaining regions (the second region, the third region, . . . etc. in this example), and the beginning addresses of the current remaining regions are obtained. The current remaining regions described above are the regions of the current scan except the current decoding region of the same scan. The decoded coefficients of the current decoding region, the nonzero history of the current remaining regions, and the beginning addresses of the current remaining regions are stored into the coefficient buffer, the nonzero history buffer, and beginning address buffer of the memory, respectively. Because only the decoded coefficients of the current decoding region, the nonzero history of the current remaining regions, and the beginning addresses of the current remaining regions are stored, the amount of memory required for decoding can be substantially reduced. The decoded coefficients of the current decoding region are then outputted to a memory as shown in step 510. Next, in step 512, it is determined whether the current decoding region of all corresponding scans of the JPEG bit stream have been processed by the first decoding procedure. If so, the decoded coefficients of the current decoding region of all corresponding scans are outputted to later stages for de-quantization and IDCT, and the second decoding procedure is performed in the current Huffman variable length decoding stage; otherwise, proceeds to the step 502 and the decoding of the current decoding region corresponding to the next scan begins.

In the second decoding procedure, a region other than the decoding region in the first decoding procedure, such as the second region is selected as the new current decoding region in step 520. A scan is then selected as a current scan in step 522. The scan selection in step 522 will be sequentially performed from scan 0 to the last scan in the JPEG bit stream. Next, step 524 is executed to access the memory for retrieving the beginning address of the current decoding region of the current scan and decode the current decoding region of the current scan. The beginning address of the current decoding region is fetched directly from beginning address buffer obtained and stored during the first decoding procedure. After that, the decoded coefficients of the current decoding region are outputted to the memory, as indicated in step 526. A determination is then made as to whether or not the current decoding region of every scan has been decoded, as shown in step 528. If so, the decoded coefficients of the current decoding region of all corresponding scans are outputted to later stages for de-quantization and IDCT, and the method proceeds to step 530; otherwise, the method proceeds to step 522. In step 530, it is determined whether all regions of the JPEG bit stream have been decoded. If so, the method ends; otherwise, the method proceeds to step 520 for decoding other regions (for example, the third region, the fourth region, . . . etc.) of all the scans.

As described above, the first decoding procedure is to decode all scans, but only to store the decoded coefficients of the current decoding region (ex. the first region) corresponding to all scans, the nonzero history of the remaining regions (ex. the second region, the third region, . . . etc.) corresponding to all scans, and the beginning addresses of the decode coefficients of the remaining regions corresponding to all scans. In the second decoding procedure, the remaining regions (ex. the second region, the third region, . . . etc.) of all scans are decoded referring to the nonzero history and the beginning addresses obtained during the first decoding procedure, and the decoded coefficients of all remaining regions of all scans are obtained. Since the nonzero history and the beginning addresses of the remaining regions corresponding to all scans are obtained and stored into the memory during the first decoding procedure, the remaining regions are not required to be re-decoded. In addition, the nonzero history buffer used in the first decoding procedure can be reclaimed and the reclaimed memory can be reallocated to the coefficient buffer, allowing the coefficient buffer to provide more memory capacity needed for the decoding of the new current decoding regions in the second decoding procedure. Therefore, the size of the regions decoded in the second decoding procedure could be larger and contains more MCU rows. In the illustrated embodiment, the first region contains three MCU rows, and the other regions can contain as much as six MCU rows. In this example the third region contains only five MCU rows because there are totally twenty MCU rows and no more MCU rows left un-assigned. In this way, the progressive JPEG decoding method and apparatus disclosed above can be performed effectively in the case of having a limited memory resource.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of progressive joint photographic experts group (JPEG) decoding, being used for decoding a JPEG bit stream as image data indicative of an image in an apparatus for JPEG decoding, the apparatus including a memory, the method comprising the steps of:
   receiving data indicative of a scan in the JPEG bit stream;
   dividing the data indicative of the scan into a plurality of regions;
   selecting one of the regions as a decoding region;
   decoding the data indicative of the scan into a plurality of decoded coefficients for each of the plurality of regions;
   producing a corresponding nonzero history of each of decoded coefficients of remaining regions according to data corresponding to the remaining regions, wherein the remaining regions are the regions of the scan except the decoding region; and
   storing the decoded coefficients of the decoding region in the memory;
   storing the corresponding nonzero history of each of the decoded coefficients of each of the remaining regions in the memory, wherein the nonzero history indicates whether one associated decoded coefficient is zero and the size of the nonzero history is smaller than the size of one associated decoded coefficient; and
   outputting the decoded coefficients of the decoding region, which are indicative of a portion of the image data;
   wherein the corresponding nonzero history of each of the decoded coefficients of each of the remaining regions, other than all of the decoded coefficients of each of the remaining regions, are stored for Huffman variable length decoding in decoding the JPEG bit stream so as to reduce the resource of the memory required for decoding the JPEG bit stream as the image data.

2. The method according to claim 1, wherein the step of decoding the data indicative of the scan, after the data indicative of the scan are decoded, further comprises the step of: storing a beginning address of each of the remaining regions in the memory.

3. The method according to claim 2, wherein the step of decoding the data indicative of the scan further comprises the step of: reading data from the JPEG bit stream according to the beginning addresses during decoding the remaining regions.

4. The method according to claim 1, wherein number of the regions for the scan is determined according to the size of the memory.

5. The method according to claim 1, wherein the sizes of the regions are in the unit of a minimum coded unit (MCU) row.

6. The method according to claim 1, wherein the JPEG bit stream includes a plurality of scans; the first one of the scans represents a portion of the image data and is indicative of a rough version of the image to be displayed; the scans except the first one are used for refining the rough version of the image; when all of the scans are decoded completely, the image data are constructed.

7. A method of progressive joint photographic experts group (JPEG), for use in an apparatus for JPEG decoding, wherein the apparatus includes a memory and is used for receiving a JPEG bit stream in order to output image data indicative of an image, and the image can be displayed according to the image data, the method comprising the steps of:
   receiving a scan of the JPEG bit stream;
   dividing the scan into a plurality of regions;
   performing a first decoding procedure including the steps of:
      defining the first one of the regions as a decoding region; and
      decoding the scan, and storing decoded data in the memory, the decoded data including a plurality of decoded coefficients of the decoding region, a non-zero history of the remaining regions, and beginning addresses of remaining regions, wherein the remaining regions are the regions of the scan except the decoding region of the scan, the nonzero history of each of the remaining regions being a non-zero history signal, the non-zero history signal indicating whether one associated decoded coefficient of one of remaining regions is zero and the size of the non-zero history signal is smaller than the size of one associated decoded coefficient;
   outputting the decoded coefficients of the decoding region so as to construct a portion of the image data;
   performing a second decoding procedure including the step of:
      decoding data from the JPEG bit stream that are read according to each of the beginning addresses of the remaining regions, and storing the decoded coefficients of each of the remaining regions; and
   outputting the decoded coefficients of each of the remaining regions so as to construct a portion of the image data;
   wherein the corresponding nonzero history of each of the decoded coefficients of each of the remaining regions, other than all of the decoded coefficients of each of the remaining regions, are stored for Huffman variable length decoding in decoding the JPEG bit stream so as to reduce the resource of the memory required for decoding the JPEG bit stream as the image data.

8. The method according to claim 7, wherein number of the regions of the scan is determined according to the size of the memory.

9. The method according to claim 7, wherein the sizes of the regions are in the unit of minimum coded unit (MCU) row.

10. The method according to claim 7, wherein the JPEG bit stream includes a plurality of scans; the first one of the scans represents a portion of the image data and is indicative of a rough version of the image to be displayed; the scans except the first one are used for refining the rough version of the image; when all of the scans are decoded completely, the image data are constructed.

11. An apparatus for joint photographic experts group (JPEG) decoding, for receiving a JPEG bit stream so as to output image data indicative of an image, the apparatus comprising:
   a memory;
   a memory management unit, coupled to the memory, for controlling access to the memory; and a processing unit, coupled to the memory and the memory management unit, for receiving the JPEG bit stream, and for decoding the JPEG bit stream to output the image data;

wherein the processing unit receives data indicative of a scan of the JPEG bit stream;

divides the data indicative of the scan into a plurality of regions;

selects one of the regions as a decoding region;

decodes the data indicative of the scan to produce a plurality of decoded coefficients of the decoding region according to data indicative of the decoding region and a nonzero history of decoded coefficients of remaining regions, which are the regions except the decoding region, according to data indicative of the remaining regions;

stores the decoded coefficients of the decoding region and the nonzero history of decoded coefficients of the remaining regions in the memory, the nonzero history of each of the decoded coefficients of remaining regions being a non-zero history signal, the non-zero history signal indicating whether one associated decoded coefficient of one of remaining regions is zero and the size of the non-zero history signal is smaller than one associated decoded coefficient; and outputs the decoded coefficients of the decoding region so as to construct a portion of the image data;

wherein the corresponding nonzero history of each of the decoded coefficients of each of the remaining regions, other than all of the decoded coefficients of each of the remaining regions, are stored for Huffman variable length decoding in decoding the JPEG bit stream so as to reduce the resource of the memory required for decoding the JPEG bit stream as the image data.

12. The apparatus according to claim 11, wherein the processing unit is a digital signal processor (DSP).

13. The apparatus according to claim 11, wherein the processing unit reads data from the JPEG bit stream according to beginning addresses of the remaining regions during decoding the remaining regions.

14. The apparatus according to claim 11, wherein number of the regions for the scan is determined according to the size of the memory.

15. The apparatus according to claim 11, wherein the sizes of the regions are in the unit of minimum coded unit (MCU) row.

16. The apparatus according to claim 11, wherein the JPEG bit stream includes a plurality of scans; the first one of the scans represents a portion of the image data and is indicative of a rough version of the image; the scans except the first one are used for refining the rough version of the image; when all of the scans are decoded completely, the image data are constructed.

17. An apparatus for joint photographic experts group (JPEG) decoding, being used for receiving a JPEG bit stream and outputting image data according to the JPEG bit stream, the apparatus comprising:

a memory;

a memory management unit, coupled to the memory, for controlling access to the memory; and a processing unit, coupled to the memory and the memory management unit, for receiving the JPEG bit stream and for decoding the JPEG bit stream to output the image data;

wherein the processing unit receives a scan of the JPEG bit stream;

divides the scan into a plurality of regions;

defines the first one of the regions as a decoding region; and decodes the scan, and stores decoded data in the memory, wherein the decoded data include a plurality of decoded coefficients of the decoding region, a nonzero history of decoded coefficients of remaining regions, and beginning addresses of the remaining regions, wherein the remaining regions are the regions of the scan except the decoding region of the scan, the nonzero history of each of the remaining regions being a non-zero history signal, the non-zero history signal indicating whether one associated decoded coefficient of one of remaining regions is zero and the size of the non-zero history signal being smaller than the size of one associated decoded coefficient; and outputs the decoded coefficients of the decoding region so as to construct a portion of the image data;

wherein the processing unit decodes data from the JPEG bit stream that are read according to each of the beginning addresses of the remaining regions, and stores the decoded coefficients of each of the remaining regions; and outputs the decoded coefficients of each of the remaining regions so as to construct a portion of the image data;

wherein the corresponding nonzero history of each of the decoded coefficients of each of the remaining regions, other than all of the decoded coefficients of each of the remaining regions, are stored for Huffman variable length decoding in decoding the JPEG bit stream so as to reduce the resource of the memory required for decoding the JPEG bit stream as the image data.

18. The apparatus according to claim 17, wherein number of the regions for the scan is determined according to the size of the memory.

19. The apparatus according to claim 17, wherein the sizes of the regions are in the unit of minimum coded unit (MCU) row.

20. The apparatus according to claim 17, wherein the JPEG bit stream includes a plurality of scans; the first one of the scans represents a portion of the image data and is indicative of a rough version of the image; the scans except the first one are used for refining the rough version of the image; when all of the scans are decoded completely, the image data are constructed.

* * * * *